United States Patent [19]

Theurer

[11] 4,109,267
[45] Aug. 22, 1978

[54] SHUTTER CONTROL APPARATUS FOR CAMERA DEVICES

[75] Inventor: Richard Theurer, Höfen (Enz), Fed. Rep. of Germany

[73] Assignee: Prontor-Werk Alfred Gauthier GmbH, Wildbad, Fed. Rep. of Germany

[21] Appl. No.: 670,322

[22] Filed: Mar. 25, 1976

[30] Foreign Application Priority Data

Mar. 29, 1975 [DE] Fed. Rep. of Germany ....... 2514169

[51] Int. Cl.² ............................................... G03B 9/66
[52] U.S. Cl. .................................... 354/266; 354/251; 354/289
[58] Field of Search ............... 354/250, 266, 233, 251, 354/289, 53, 219

[56] References Cited

U.S. PATENT DOCUMENTS

| 1,948,039 | 2/1934 | Kuepper | 354/266 |
| 2,211,355 | 8/1940 | Stewart | 354/251 |
| 3,526,185 | 3/1976 | Schwarz | 354/251 |

FOREIGN PATENT DOCUMENTS

| 1,333,384 | 6/1963 | France | 354/251 |
| 2,007,612 | 9/1971 | Fed. Rep. of Germany | 354/289 |
| 672,346 | 10/1964 | Italy | 354/289 |
| 357,621 | 11/1961 | Switzerland | 354/251 |

*Primary Examiner*—Edna M. O'Connor
*Attorney, Agent, or Firm*—Arthur A. March

[57] ABSTRACT

The disclosed invention embodies a unique control for cocking and then releasing the shutter blades covering the lens structure of a photographic camera unit. The shutter blade operating mechanism is supported within a housing in which there are provided a pair of slotted regions through which extend control levers used to provide, when moved, the operational control needed to cock or release the blade structure relative to the photographic lens proper. Each control lever is provided at its end portion with a form of identification and conjoint means operable therewith and having a concordant form of identification so that through observation it may immediately be determined by an operator in which of two operational states the camera is instantaneously conditioned. Provisions are made for interlocking and coupling the controlling levers relative to each other, as well as to return each lever to its original position following a release. These indications which are used to provide representations of the operational states may be due to appropriately arranged color, shape, character indications, or similar identification of the instantaneous position of the control, thereby to insure that the operator will be placed in immediate awareness of the operation to be expected.

18 Claims, 5 Drawing Figures

SHUTTER CONTROL APPARATUS FOR CAMERA DEVICES

The invention relates to a photographic camera shutter control mechanism. Control is provided by a first operating member for cocking the shutter mechanism and a second operating member for releasing the shutter mechanism after operation. Both of the members, for example, are formed as levers. Such levers are manually actuatable and after the cocking or release movement return under the action of a return spring or the like so as to be placed into their original positions.

It is already known to provide a photographic shutter of the aforesaid kind with a so-called cocked indicating device. This indicating device consists substantially of a displaceably mounted component which, protruding during cocking of the shutter from the housing, is visible only for so long as the shutter drive is in the cocked state. On the other hand, there is no indication to the photographer of the alternative, i.e., the released or uncocked condition of the shutter. A clear indication is thus provided only for one particular case, that is the cocked state of the shutter. This shows a certain incompleteness and need for improvement of the known indicating device, because it makes additional demands on the photographer with regard to attention and brainwork, which a device of this kind should actually relieve.

It is an object of the invention to remedy the aforesaid deficiency, i.e., with relatively simple means to provide an indicating device for a photographic shutter which in each state of operation, thus both in the cocked state and in the uncocked state as well of the shutter, will make a clear and hence positive statement as to in what operating state the shutter is in at the moment, and which, at the same time, provide the photographer with an indication as to which operating member has to be operated.

According to the present invention, there is provided a photographic shutter having a first operating member for cocking the shutter mechanism and a second operating member for releasing the shutter mechanism. Both of these members are manually actuatable and after the cocking or release movement, subject to the action of a return spring, return to their original positions, and the shutter is provided with an indicating device which is movable into one or other of two indicating states in accordance with the actuation of one or other of the operating members. There is also an associated coding mechanism provided between the individual indicating states of the indicating device and the respective operating member, which provides an indication concordantly of the state of the shutter mechanism.

Hence, the shutter with this arrangement provides a constant indication as to the prevailing state of camera operation. A further advantage is based on the fact that the photographer can ascertain from the information provided an indication as to whether the operating member for cocking the shutter is to be actuated or the operating member for releasing the shutter drive is to be actuated. All in all, this indicating device ensures an optimally simple operation of a photographic shutter avoiding any doubt as to the actuating sequence.

The device is preferably provided with two surface structures differing from each other by different color markings and/or by different surface characteristic or shape. Although generally the visual distinction of the surface structures is regarded as sufficient, this in no way excludes the additional or alternate use of symbols or surface features which enable the photographer to distinguish the indication by touch.

Further, preferably, the indicating device is provided with two displaceable indicating members influencing each other mutually with regard to their relative position, only one of the members being visible to indicate the prevailing operating state. An advantage of this arrangement is based on the fact that on the one hand it may be realized with relatively simple structural means and on the other hand without any significant requirement of additional installation space and additional expensive driving means in photographic shutters with sliding crank drive for the shutter leaves.

For the purpose of obtaining a clear indication plainly visible to the photographer at any time, further preferably, the indicating lug and the knob of the operating member to be actuated on its appearance is provided concordantly with a conforming color marking or made of identical shape. Hence the photographer need only inform himself by way of the color marking or shape of the indicating element to ascertain the instantaneous operational state the shutter is in and which of the two operating members should be actuated in accordance with the prevailing operating state. A structurally simple and relatively cheap arrangement for manufacture is obtained according to a further proposal of the invention, in that the two indicating lugs are lever-like and fixedly mounted on axles spaced from one another, and that both indicating lugs by means of a pin and slot connection acting between the bearing axles are brought into positive engagement with one another.

A structurally different embodiment of the device in accordance with the invention may be attained in simple manner in that the indicating device is formed of a rotatably mounted disc which is in operational engagement with the cocking shaft of the cocking mechanism. An advantage of this arrangement may be seen in the fact that only a single component is required for the alternative concordant indication. In accordance with the invention, the drive may be effected herein by means of a transmission gear which is in operational engagement with the cocking shaft, by means of which gearing the range of the angle of rotation of the drive part may be, in a simple manner, adapted to be driven.

The present invention will be described further, by way of example, with reference to the accompanying drawings, in which.

Figure 1:
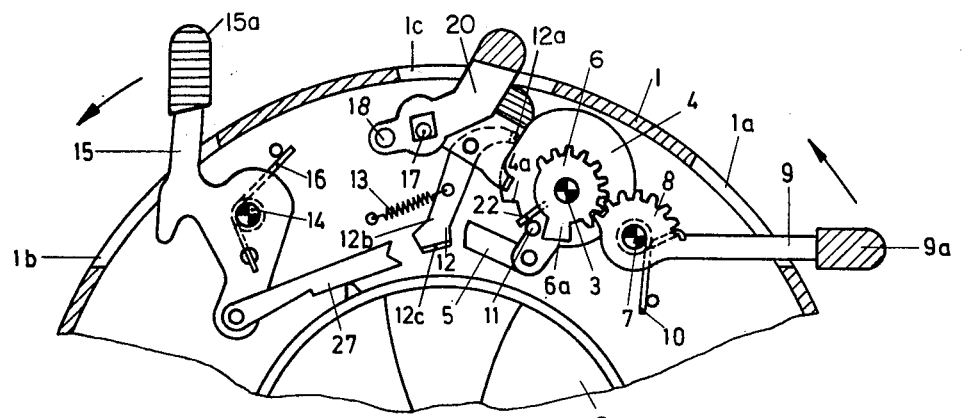
FIG. 1 shows a partial view of a shutter in the uncocked state having a device for indicating the operational state.

In the drawing the numeral 1 denotes the housing and 2 represents the leaves of a photographic lens shutter. For driving the leaves 2, a known crank drive is used which comprises a cocking axle 3 whose rotation controls shutter blade movement (mechanism not shown) in known fashion. A rotatable crank disc 4 mounted on axle or shaft 3 is adapted to turn a crank 5 pivotally connected to the crank disc 4. A spring, not shown, serves to store the necessary driving force for the crank disc 4. In addition to the crank disc 4, the cocking axle 3 carries a pinion 6 which is loosely mounted thereon and engages with a toothed segment 8 rotatably mounted on a pin 7. The toothed segment 8 has a lever arm 9 provided thereon which passes through a slot 1a in the housing 1. The outer end of the arm has a grip member 9a provided thereon. The lever 9, against the action of a return spring 10, can be displaced to move the shutter drive comprising elements 3, 4, 5 and 6 into the cocked position. In this case, the cocking lever 9 has to be moved from its original position as shown in a clockwise direction about the bearing pin 7 as indicated by the arrow in FIG. 1. When this occurs, the pinion 6 rotates clockwise and a radial arm 6a formed on the pinion 6 acts on a pin 11 provided on the crank disc 4 and hence the crank disc 4 rotates with the pinion 6. If at the end of the cocking movement the cocking lever 9 is released, then the cocking lever 9, subject to the action of the return spring 10, returns into its original position shown in FIG. 1. The crank disc 4, on the other hand, is retained or locked in the cocked position by a stop cam 12a which is formed on a stop lever 12 pivotally mounted in the housing which, subject to the action of a spring 13 engaging the lever 12, assumes a position in front of a radial projection 4a of the disc 4 when the disc 4 is rotated into the cocked position.

The shutter is also released in known manner by means of a release lever 15 rotatably mounted on a pin 14, the rotation of which controls shutter blade movement (not shown) in a direction opposite to that of the turning axle 3. This lever 15 has a return spring 16 for returning the lever 15 to its original position as indicated in FIG. 1, if the lever 15 has been displaced in the direction of the arrow indicated in FIG. 1 and has then been released. The release lever 15 passes through a slot 1b in the shutter housing 1 and is provided at its outer end with a grip member 15a. At its other end, the release lever 15 carries a thrust pawl 27 which is hingedly connected thereto, and which cooperates with an arm 12b of the stop lever 12 facing it. If the release lever 15 is moved from its original position shown in FIG. 1 in the direction of the arrow, the thrust pawl 27 engages a flap 12c of the stop lever 12, whereby the lever 12 is displaced from the locking position and releases the crank disc 4 for rotation. The rotation of the disc 4 drives the thrust pawl 5 which executes a reciprocating movement and by means of a leaf driving ring, not shown, causes the shutter leaves 2 to execute an opening and closing movement.

Since in the above-described construction of the shutter drive both the cocking lever 9 and the release lever 15, after actuation, immediately return into the previously assumed original position shown in FIG. 1, a photographer would be unable to ascertain the operating state of the shutter. In order therefore to provide the photographer when manipulating such a shutter with an indication of the state of the shutter, the shutter drive arrangement 3, 4, 5 has an indicating device associated therewith which may assume one or other of two alternative states to provide a suitable indication. The state of the indicating device is made dependent upon the actuation of the cocking lever 9 and the release lever 15.

Figure 2:
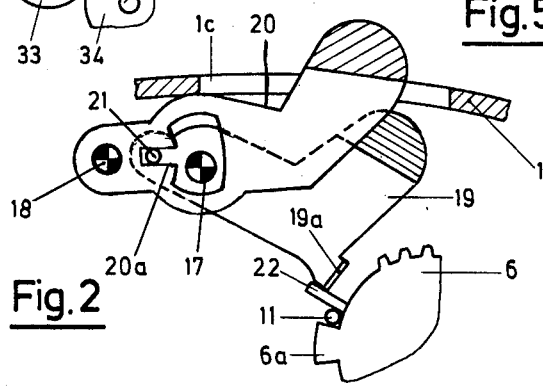
FIG. 2 is a view of the indicating device on an enlarged scale, indicating the same operational state of the shutter as FIG. 1.
Figure 3:
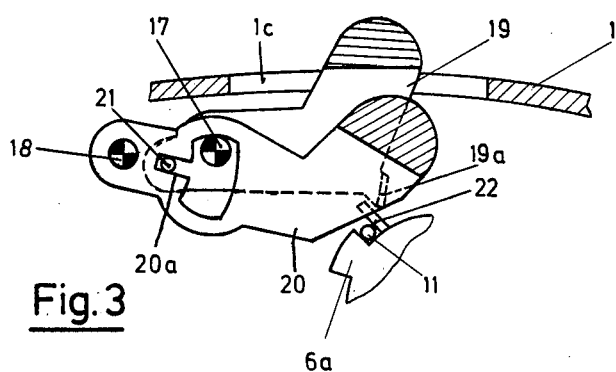
FIG. 3 shows the indicating device of FIGS. 1 and 2 in the alternative setting, that is, the cocked state of the shutter.

In accordance with the embodiment shown in FIGS. 1 to 3, the device for indication of the operational state of the shutter may comprise two indicating levers 19 and 20 rotatably mounted on pins 17 and 18, respectively. One or other of the levers 19 or 20, dependent upon the actuation of the cocking lever 9 or release lever 15, respectively, protrudes through a slot 1c in the shutter housing 1.

In order to provide mutally dependent intercoupling between the two levers 19 and 20, the pins 17 and 18 are spaced apart and the levers 19 and 20 are coupled together by means of a pin and slot coupling 21, 20a. In order that the two indicating levers 19 and 20 are moved in accordance with the movement of the shutter drive 3 to 5, the lever 19 is formed such that a radial pin 22 rotating with the crank disc 4, during cocking, engages against a bent-over flap 19a formed on the indicating lever 19. As the pin 22 rotating with the crank disc 4 continues its movement the indicating lever 19 is caused, in turn, to execute an anti-clockwise rotary movement about the bearing pin 17, while the indicating lever 20 rotates about the bearing pin 18, in the opposite direction to the lever 19 due to the influence of the pin 21. The indicating levers 19 and 20 thus change from the position shown in FIG. 2 into the position shown in FIG. 3. Instead of the indicating lever 20 protruding from slot 1c which in the present embodiment indicates the uncocked state of the shutter (angularly directed hatching of the visible surface) the indicating lever 19 (horizontally directed hatching of the visible surface) protrudes from the slot 1c whereby it is indicated that the shutter is in the cocked position.

To enable the photographer to more easily ascertain the state of operation of the shutter, the indicating levers 19 and 20, i.e., each portion thereof protruding from the shutter housing 1 is provided with a different color marking. For example, the exposed portion of one indicating lever 20 (angularly directed hatching) could be colored red, the other indicating lever 19 (horizontally directed matching) on the other hand could be provided with an exposed portion colored green. The operation of the arrangement by the photographer could also be further facilitated in that each indicating levers 19 or 20 and the knob 9a or 15a may be provided with corresponding color markings. Thus, the indicating lever 20, which appears when the shutter is released, and the knob 9a of the cocking lever 9 may be marked by a red coloring, and in contrast thereto, the indicating lug 19, which during cocking replaces the indicating lever 20, and the release lever 15 may be provided with a green coloring or vice versa.

Instead of the color difference, the indicating levers 19 and 20 could also be provided with a differently profiled surface or the like, such that one lever 19 has a smooth surface and the other lever 20 on the other hand a surface provided with grooves, ribs or the like. Similarly, the indicating levers 19 and 20 should have associated therewith knobs 9a and 15a provided with the same surface characteristics. This enables the photographer, besides having a visual indication of the operating states, to distinguish the operating states by touch.

Figures 4, 5:
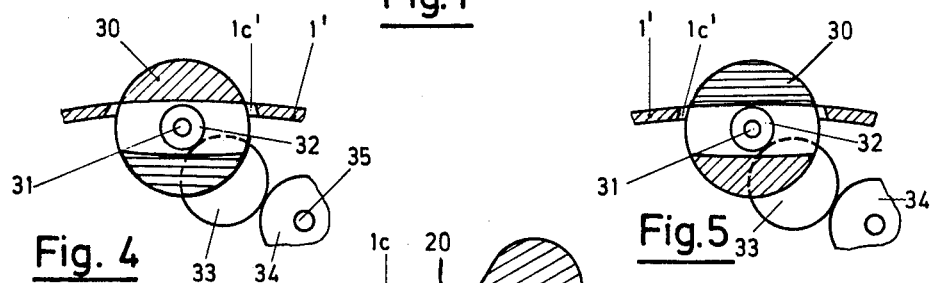
FIGS. 4 and 5 show a further embodiment of a device for indicating the prevailing operational state of the shutter.

According to a further embodiment shown in FIGS. 4 and 5, the device for providing an indication of the operational state of the shutter may also be formed of a preferably circular disc 30. The disc 30 is rotatably mounted in the shutter housing so that only a part of its surface is visible. The disc 30 is expediently mounted on a pin 31 so as to be freely rotatable and protrudes through a slot 1c' of the housing wall 1'. The disc itself has a pinion 32 non-rotatably connected thereto, which in turn engages with the cocking axle 35 (FIG. 4) of the shutter via a transmission gearing 33, 34. In the same manner as in the embodiment described above and shown in FIGS. 1 to 3, the indicating disc 30 may be provided with part surfaces of varying color or surface profiling. The coupling to the cocking axle 35 is such that, for example, a part surface colored red (angularly directed hatching) is visible to the photographer in accordance with FIG. 4 when the shutter is cocked and the release lever of the shutter is to be actuated. Alternatively, the other part surface (horizontally directed hatching) of the disc 30, after actuating the release, as shown in FIG. 5, will protrude from the housing thereby indicating to the photographer that the shutter has been released and consequently that the cocking lever has to be actuated.

Various other modifications and changes may be used where made within the scope of the appended claim subject matter.

What is claimed herein is:

1. Photographic shutter having an observable manually actuable first operating member movable for cocking the shutter mechanism and an observable manually actuable second operating member movable for releasing the shutter mechanism, both of which members after the cocking or release movement, subject to the action of a corresponding return spring, return to their original positions, wherein the shutter is provided with an observable indicating device which is movable into one or the other of two indicating states in accordance with the actuation of one or the other of the operating members and wherein observable associated coding means are concordantly provided between the individual indicating states of the indicating device and the corresponding operating members, for thereby providing an observable concordant indication of the state of the shutter mechanism.

2. Shutter according to claim 1 wherein the operating members are both formed as actuating levers.

3. Shutter according to claim 1 wherein the indicating device is provided with two indicating surface structures differing from one another in color marking.

4. Shutter according to claim 1 wherein the indicating device is provided with two indicating surface structures differing from one another in distinguishing physical conformation.

5. Shutter according to claim 1 wherein the indicating device is provided with two indicating members mutually interconnected and inversely relatively displaceable, so that only one such member indicating the operating state of the shutter is visible.

6. Shutter according to claim 5 wherein each of the operating members is provided with an actuating knob and each indicating member and the knob of its associated operating member are provided with corresponding color markings.

7. Shutter according to claim 5 wherein each of the operating members is provided with an actuating knob and each indicating member and the knob of its associated operating member are provided with distinguishing physical conformations.

8. Shutter according to claim 5 wherein the two indicating members are formed as indicating levers and are fixedly mounted for pivoting on pins spaced from one another, and both of such indicating members are operatively interconnected with one another by a pin and slot coupling located in the space between such pins.

9. Shutter according to claim 1 wherein the shutter is provided with a cocking mechanism operatively connected with the operating members, and the indicating device is formed of a rotatably mounted indicating disc which is in operative engagement with the cocking mechanism for rotation thereby in accordance with the actuation of one or the other of the operating members to indicate thereby the state of the shutter mechanism.

10. Shutter according to claim 9 wherein the cocking mechanism includes a cocking shaft, and rotation of the indicating disc is effected by means of a transmission gearing in operative engagement with the cocking shaft of the shutter cocking mechanism.

11. Operating means for use with a control means to open and close the blades of a camera shutter mechanism in a housing, which comprises:
a manually actuatable first operating member movable for cocking the camera shutter blade control means and provided with an observable first portion external to the housing,
a manually actuable second operating member movable for releasing the camera shutter blade control means and provided with an observable second portion external to the housing,
a pair of opposed separate axle means upon which the first and second operating members are respectively adapted to rotate for movement for correspondingly cocking and releasing the shutter blade control means,
respective return spring means individually actuatable after the corresponding cocking and releasing movement to return the first and second operating members to their original positions,
observable indicating means movable into one or the other of two indicating states in accordance with the actuation of one or the other of the operating members, and
observable associated coding means concordantly provided between the individual indicating states of the indicating means and the corresponding operating members, including a first coding on the first portion of the first operating member external to the housing and on the indicating means in concordance with one of the indicating states thereof and a second coding on the second portion of the second operating member external to the housing and on the indicating means in concordance with the other of the indicating states thereof, for thereby providing an observable concordant indication of the state of the shutter mechanism.

12. Operating means according to claim 11 wherein the indicating means includes first and second indicating portions provided with said first and second codings thereon for concordantly indicating the individual states of the indicating means, the indicating portions being correspondingly reciprocally movable between a non-observable position and an observable position inversely relative to each other to limit the movement to observable position to only one of the indicating portions at a time in accordance with the actuation of the operating member on which the corresponding coding is provided.

13. Operating means according to claim 12 wherein the first and second indicating portions are reciprocally inversely movable between a non-observable position within the housing and an observable position external to the housing, and the housing is provided with opening means therein through which the indicating portions are correspondingly adapted to protrude to the exterior of the housing upon moving from non-observable position to observable position.

14. Operating means according to claim 13 wherein the indicating means includes first and second indicating members having said first and second indicating portions thereon and being rotatably mounted on corresponding opposed separate axle elements, and limiting means including pin and slot coupling means mutually interconnecting the indicating members for reciprocal movement inversely relative to each other between said non-observable and observable positions.

15. Operating means according to claim 13 wherein the indicating means includes a disc having said first and second indicating portions peripherally disposed thereon in substantially diametrically opposed relation and being rotatably mounted on an axle in the housing for corresponding reciprocal rotational movement of the peripherally disposed indicating portions inversely to each other between said non-observable and observable positions.

16. Operating means according to claim 15 wherein the disc is a rotatable color disc having the first and second indicating portions in the form of semi-circular segments of different color corresponding to the first and second codings, and the observable first and second portions of the operating members external to the housing include corresponding codings of such different colors.

17. Operating means according to claim 13 wherein the observable first and second portions of the operating members external to the housing are in the form of lever means for manually actuating such operating members, and the housing is provided with slotted means therein through which the lever means are adapted to protrude to the exterior of the housing.

18. Operating means according to claim 13 wherein the coding means is provided in the form of first and second codings differing from each other in at least one of color, surface characteristics, shaping and selected variances thereof.

* * * * *